Patented June 16, 1953

2,642,354

UNITED STATES PATENT OFFICE 2,642,354

METHOD AND COMPOSITION FOR THE CONTROL OF UNDESIRED VEGETATION

Keith C. Barrons, Midland, Mich., assignor to The Dow Chemical Company, Midland, Mich., a corporation of Delaware No Drawing. Application September 10, 1951,
Serial No. 245,978

6 Claims. (Cl. 71—2.7)

This invention relates to the regulation of the growth of vegetation and is particularly directed to compositions containing as an essential active ingredient $\alpha,\alpha$-dichloropropionic acid or a salt thereof and to methods of controlling the growth of plants by the application of such compounds.

In recent years a variety of synthetic organic compounds has found widespread use in the regulation of plant growth. For example, certain of the chloroaryloxyaliphatic acid derivatives may be applied so as to kill or markedly inhibit broadleafed weeds without injury to lawn grass or monocotyledonous crops. On the other hand, sodium trichloroacetate has found application in the control of certain grasses. However, economical control of established stands of hardy, perennial grasses remains a major problem for the farmer.

It is among the objects of this invention to provide a method and improved compositions for the control of plant growth. An additional object is to provide a method and compositions which may be employed for the control of hardy perennial gramineous weeds. Other objects will become apparent from the following specification and claims.

According to the present invention, it has been discovered that compositions comprising as active ingredients $\alpha,\alpha$-dichloropropionic acid and its salts may be used for controlling the growth of vegetation and for killing weeds. In a preferred embodiment such compositions have been found to be particularly useful in the control of annual and perennial grasses. Moreover, in certain cases it has been possible to effect selective control of gramineous weeds in the presence of desirable broadleafed plants.

In carrying out the invention, $\alpha,\alpha$-dichloropropionic acid may be dispersed in a carrier such as water or a petroleum distillate oil. The compositions so obtained are then applied with conventional spray equipment so as to wet the foliage of the plants to be controlled or the growth medium in proximity to such plants. The term "plants," as used herein, is considered to include germinating seedlings in the growth medium. Compositions of the $\alpha,\alpha$-dichloropropionic acid in oil may be further compounded with oil-soluble emulsifying agents to produce emulsifiable concentrates. Such concentrates are then dispersed in water and applied as set forth above for the control of undesired vegetation. Similarly, aqueous solutions may be modified by the inclusion of wetting agents.

In a further method of carrying out the invention an ammonium, organic amine or metal salt of $\alpha,\alpha$-dichloropropionic acid is dispersed in water to prepare spray compositions which are applied as described above, with or without the inclusion of wetting or dispersing agents as may be desired.

Alternatively, the $\alpha,\alpha$-dichloropropionic acid or its salts are intimately mixed with an inert, solid carrier such as pyrophyllite, diatomaceous earth, volcanic ash, kaolin, fuller's earth, wood flour or vermiculite. In preparing such compositions the acid or salt is mixed thoroughly with the solid carrier to provide a uniform intimate dispersion which may be further milled to finer particle size if desired. The compositions so prepared in pulverulent form are suitable for application with conventional dusting equipment for the control of gramineous weeds. When vermiculite or other granular solid carrier is used the composition is suitable for use in grain drills or fertilizer spreaders.

In one preferred embodiment of the invention, the compositions of the invention are utilized in conjunction with conventional tillage practice for the improved control of weeds. For example, in eradicating established stands of noxious perennial grasses such as quack or Bermuda grass it is sometimes advantageous to plow and disk the area thoroughly before spraying with $\alpha,\alpha$-dichloropropionic acid or its salts in order to weaken the reserves of the plants and make them more vulnerable to control by the chemical applied. Annual grass weeds, such as foxtail, crab and barnyard grass, which will normally germinate after such tillage in areas infested with their seed, are likewise controlled by the application of the compositions of the invention either after or shortly before the emergence of the seedling plants.

It is among the advantages of this invention that no long-enduring sterilization of the soil is occasioned by the weed control operations. For example, residues of the active compounds apparently disappear through the action of weathering factors such as leaching and chemical and microbiological degradation, so that sensitive crops may be planted within a reasonable time after treatment.

In operating in accordance with the invention any suitable proportion of the active compounds may be combined with the carriers as set forth above to prepare dilute spray compositions. From about 4 to 100 lbs. of $\alpha,\alpha$-dichloropropionic acid or an equivalent amount of a salt thereof conveniently is employed in each 100 gallons of the water or other liquid carrier. The preferred dosage to be employed is influenced by a variety of factors such as soil type and the amount and frequency of rainfall, as well as the plant species to be controlled and the stage of growth thereof. In general, the application is controlled so as to apply from about 10 to 50 pounds of acid equivalent of $a,a$-dichloropropionic acid per acre although lower rates are sometimes effective on sensitive grasses and somewhat higher rates may sometimes be necessary for highly resistant species. The volume of spray employed is not critical, the success or failure of the application depending largely upon the proper selection of dosage per acre and the accomplishing of a relatively uniform dispersion of the chemical over the area under treatment.

In preparing compositions utilizing a solid carrier, from about 2 to 20 parts of $a,a$-dichloropropionic acid or an equivalent amount of a salt thereof are used to each 100 parts of ultimate composition and from about 50 to 250 pounds of the composition are applied per acre.

For selective control of grasses in the presence of desirable, resistant broadleafed plants the compositions comprising a salt of $a,a$-dichloropropionic acid in aqueous dispersion are preferred. For rapid contact action and more general herbicidal effect, compositions comprising $a,a$-dichloropropionic acid in an oil carrier are found advantageous.

The choice of cation for the salts of $a,a$-dichloropropionic acid does not appear to be critical. For example, salts such as the ammonium, sodium, potassium, lithium, magnesium, calcium, aluminum, copper, nickel, iron and zinc or other metal salts as well as the organic amine salts such as the anilinium, pyridinium, ethanolammonium, triethanolammonium and mono-, di- and trialkylammonium salts may be employed. A preferred embodiment of the invention comprises the water soluble salts.

A variety of oil carriers may be used in preparing compositions of the invention. Petroleum distillates, such as diesel fuel, kerosene and fuel oil, are readily available and are generally preferred, however, other oils such as agricultural spray oils also may be used to advantage. Among the latter the horticultural base oils having a high unsulphonatable residue and relatively low inherent phytotoxicity may be used and are preferred for preparing selective spray compositions. Further suitable oils are represented by the herbicidal oils such as Stoddard solvent and highly aromatic petroleum distillates. The latter are preferred for preparing spray compositions having a more general herbicidal action.

Any suitable wetting, emulsifying or dispersing agent may be used with the growth control compositions provided that it is not reactive with the ingredients of the mixture. Representative products include sulfonated castor oil, sodium lauryl sulfate, dioctyl sodium sulfosuccinate, polyoxyalkylene derivatives of fatty acids, fatty alcohols and sorbitan-fatty acid condensation products, polyalkylene glycol-alkylphenol ethers and sodium alkyl aryl sulfonates.

The following examples illustrate the invention but are not to be construed as limiting:

*Example 1*

2 grams (0.014 mole) of $a,a$-dichloropropionic acid was dissolved in 197.7 grams of water and 0.74 gram (0.007 mole) of sodium carbonate added thereto with stirring. The sodium carbonate dissolved with the evolution of carbon dioxide. The resulting solution of sodium $a,a$-dichloropropionate contained 1 percent by weight acid equivalent of $a,a$-dichloropropionic acid.

In a similar fashion, chemically equivalent proportions of zinc carbonate, ferric hydroxide, cupric carbonate, nickel carbonate, calcium hydroxide, magnesium carbonate, potassium carbonate, aniline and triethanolamine were added with stirring to separate solutions of $a,a$-dichloropropionic acid to prepare the respective zinc, ferric, cupric, nickel, calcium, magnesium, potassium, anilinium and triethanolammonium $a,a$-dichloropropionates in the form of aqueous spray compositions containing 1 percent by weight acid equivalent of $a,a$-dichloropropionic acid. In preparing the zinc, ferric, cupric, nickel, calcium and magnesium salts the mixtures were heated to 60° to 80° C. for a period of time with stirring to assure completion of reaction.

Each of the above salt solutions was applied to separate areas of soil which was prepared as a seed bed and which contained seed of a grass of the foxtail family (*Setaria sp.*). The solutions were applied so as to give uniform coverage of the soil areas and at rates of 5 pounds and 20 pounds of acid equivalent per acre.

Seedling grasses emerged in all the seed bed areas. In an untreated area the seedlings made vigorous growth. In contrast, all the areas treated with the above described salts of $a,a$-dichloropropionic acid at 5 pounds acid equivalent per acre showed marked inhibition of growth of grass beyond the coleoptile stage. In the areas treated at the 20 pounds per acre rate there was essentially complete inhibition of growth beyond the coleoptile stage.

*Example 2*

Sodium $a,a$-dichloropropionate was dissolved in water to give an aqueous spray composition containing 1 percent by weight acid equivalent of $a,a$-dichloropropionic acid. This composition was applied at a rate of 20 pounds of acid equivalent per acre, to give uniform coverage of a seed-bed area infested with crab-grass seed. A similar adjacent area was left untreated. On inspection after two weeks, thirty crab-grass seedlings were found growing vigorously in the untreated area while only one stunted seedling was alive in the treated area. In the latter a number of seedlings could be found which had emerged but died subsequent to emergence.

*Example 3*

Sodium $a,a$-dichloropropionate was dissolved in water to prepare spary compositions containing 4 pounds and 16 pounds, respectively, of acid equivalent of $a,a$-dichloropropionic acid per 100 gallons. These compositions were applied to separate field plots heavily infested with a vigorous growth of quack grass and other perennial grasses. Applications were made with a sprayer operated at 30 to 40 pounds per square inch pressure and the spray compositions were applied at the rate of 250 gallons per acre to give dosages of 10 pounds and 40 pounds of acid equivalent for the respective concentrations. The sprays were directed so as to cover the grass crowns and the soil about the plants. There was 0.18 inch of rainfall in the first week after application and 0.62 inch in the second week. From the second through the fourth weeks after application 1.67 inches of rainfall was recorded.

Over a period of three weeks the grass in both sprayed plots developed chlorosis and died back from the tips of the leaves. After four weeks no live grass could be detected in the plot sprayed at the 40 pound per acre dosage and about 90 percent kill of top growth had been effected by the 10 pound per acre dosage.

Example 4

α,α-dichloropropionic acid was dissolved in diesel fuel oil to prepare a spray composition containing 8.34 pounds of the acid per 100 gallons. This composition was sprayed on a field plot of quack grass and other perennial grasses similar to those of Example 3, and at a rate of 125 gallons per acre to give a dosage of approximately 10 pounds of α,α-dichloropropionic acid per acre. On observation three weeks later all the grass in the plot appeared dead. Further observation after 12 weeks confirmed the effective killing of gramineous weeds in the treated plot. In an adjacent plot sprayed with the diesel fuel carrier at the same rate but without α,α-dichloropropionic acid, there was considerable burning of the grass foliage but most of the plants recovered and put out new growth.

Example 5

About two weeks after the application set forth in Example 3, similar aqueous compositions of sodium α,α-dichloropropionate were applied to a further group of plots infested with quack grass and other perennial grasses. Dosages were adjusted so as to apply 5, 10, 20, 30, 40 and 50 pounds of α,α-dichloropropionic acid equivalent per acre to individual plots. There was 0.61 inch of rainfall in the first week after application, 1.06 inches the second week, 0.29 the third and 1.33 inches the fourth. Six weeks later all grass in all these plots appeared to be dead. Adjacent check plots continued to support a heavy stand of mixed grasses.

Example 6

Vigorously growing Johnson grass was mowed at a height of about 4 inches above the soil level and the composition of Example 2 applied to the surface of the soil in which the plants were growing. The application was made at such a rate as to provide a dosage of 20 pounds of acid equivalent of α,α-dichloropropionic acid per acre. On inspection of the treated area 1 month later it was found that no new growth of the Johnson grass had occurred and that the leaves remaining on the plants at the time of the treatment were either dead or severely chlorotic.

Example 7

The composition of Example 2 was applied to a dense stand of annual grass in the early tillering stage. Separate areas were treated at the rate of 10 and 20 pounds of acid equivalent of α,α-dichloropropionic acid per acre, respectively. On inspection 4 weeks later it was found that growth of the grass after treatment was strongly inhibited at both dosages with many of the grass leaves having turned brown and the remaining leaves showing severe chlorosis. An inspection of the root systems of the plants showed a severe inhibition and stunting of root growth in the treated areas in comparison to the root growth found for similar plants grown in an adjacent untreated area.

Example 8

11.5 parts of sodium α,α-dichloropropionate is thoroughly mixed with 88.5 parts of pyrophyllite and the resulting mixture ground in a hammermill to prepare a dust composition. The latter is applied at the rate of 200 pounds of composition per acre to an area infested with mixed perennial grasses. Within three weeks the grass plants show marked chlorosis and begin to die back back from the tips. In four to six weeks after treatment all grass plants appear dead in the treated area.

I claim:

1. A method for the control of undesired plant growth which comprises contacting plants and plant parts with a compound selected from the group consisting of α,α-dichloropropionic acid and its salts, such compound being employed at a dosage exerting a phytotoxic action against the plant growth concerned.

2. A method for the control of undesired plant growth which comprises applying to the plants or plant parts a compound selected from the group consisting of α,α-dichloropropionic acid and its salts, such compound being applied at a rate of at least 5 pounds of acid equivalent per acre.

3. A method for the control of undesired plant growth which comprises contacting plants and plant parts with α,α-dichloropropionic acid, said acid being employed at a dosage exerting a phytotoxic action against the plant growth concerned.

4. A method for the control of undesired plant growth which comprises contacting plants and plant parts with a water-soluble salt of α,α-dichloropropionic acid, said salt being employed at a dosage exerting a phytotoxic action against the plant growth concerned.

5. A method for the control of undesired plant growth which comprises contacting plants and plant parts with the sodium salt of α,α-dichloropropionic acid, said salt being employed at a dosage exerting a phytotoxic action against the plant growth concerned.

6. A composition for the control of undesired vegetation which comprises a liquid petroleum distillate and dispersed therein α,α-dichloropropionic acid.

KEITH C. BARRONS.

References Cited in the file of this patent

UNITED STATES PATENTS

| Number | Name | Date |
|---|---|---|
| 2,393,086 | Bousquet | Jan. 15, 1946 |
| 2,472,347 | Sexton | June 7, 1949 |

OTHER REFERENCES

Manufacturing Chemist, Feb. 1948, pages 68 and 69.

Handbook of Chemistry (Lange), 5th ed., (1944) pgs. 424 and 425.